Sargent & Covert.
Lock.

No. 47,575. Patented May 2, 1865.

Witnesses:
J. A. Davis
R. L. Osgood

Inventor:
Jas Sargent
H. W. Covert
By J. Fraser & Co.
Attys

UNITED STATES PATENT OFFICE.

JAMES SARGENT AND H. W. COVERT, OF ROCHESTER, NEW YORK.

IMPROVEMENT IN LOCKS.

Specification forming part of Letters Patent No. 47,575, dated May 2, 1865.

*To all whom it may concern:*

Be it known that we, JAMES SARGENT and H. W. COVERT, of Rochester, in the county of Monroe and State of New York, have invented certain new and useful Improvements in Magnetic Locks; and we do hereby declare that the following is a full and exact description thereof, reference being had to the accompanying drawings, making part of this specification.

Figure 3:
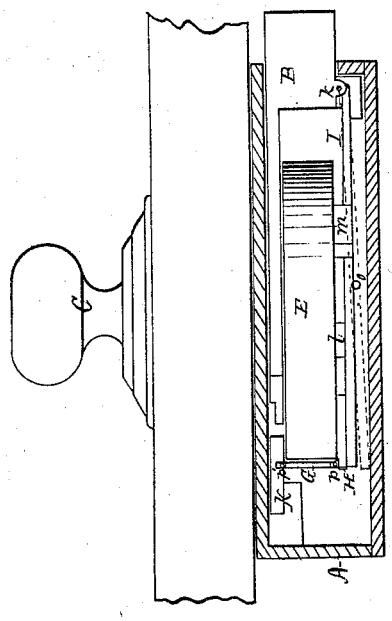
Figure 4:
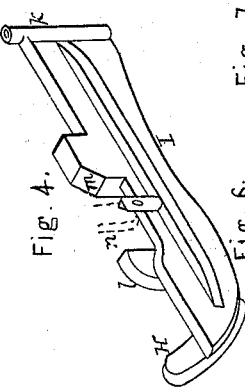
Figure 7:
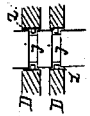
Figure 6:
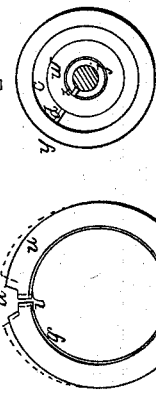
Figure 2:
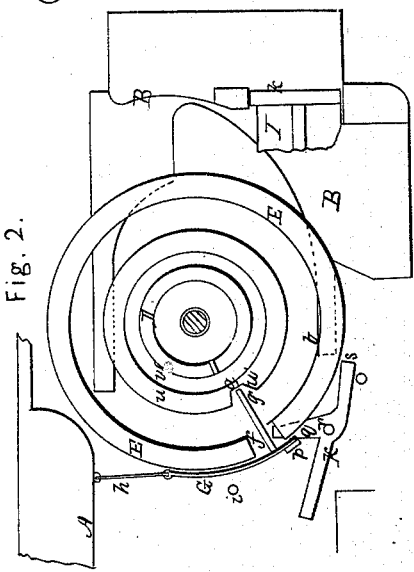
Figure 1:
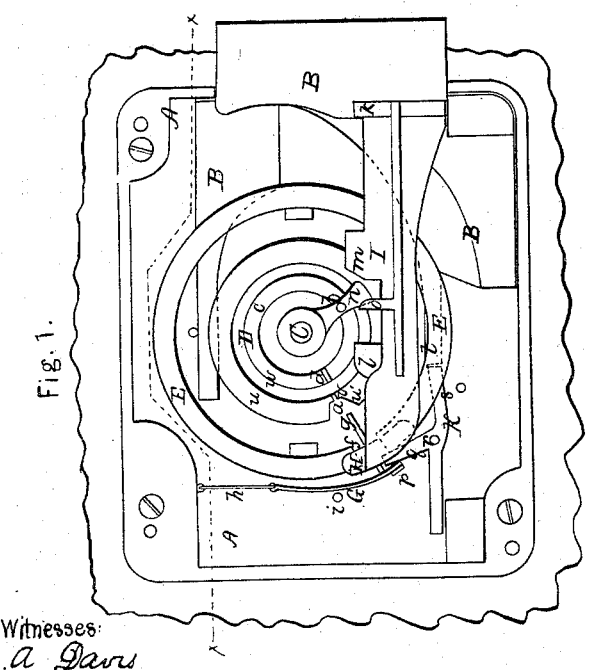
Figures 5, 8:
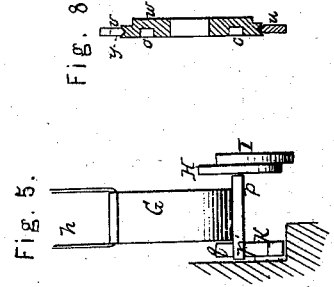

Figure 1 is an elevation of our improved lock with the back plate removed to exhibit the interior arrangement, and showing the dog as thrown out of the notches of the permutation-wheels; Fig. 2, a similar view, but with the dog thrown into the notches of the permutation-wheels, to release the bolt and allow it to be retracted; Fig. 3, a transverse horizontal section of the case of the lock in the line $x\ x$, Fig. 1; Fig. 4, a perspective view of the swing-gate holding the main armature; Fig. 5, a diagram showing a rear elevation of the armature sustaining the dog and the parts connected therewith; Figs. 6, 7, and 8, views respectively of the rim, center, and section of one of the permutation-wheels.

Like letters of reference indicate corresponding parts in all the figures.

One of the great objections of the ordinary permutation bank-locks, is that the dog that enters the notches of the permutation-wheels for allowing the bolt to retract has a direct connection with the shaft or key that operates the lock from the outside. The consequence is, that by the action of said shaft or key the dog may be brought against the edges of the permutation-wheels at any time, and by means of a delicately-adjusted instrument applied at the outside an accomplished burglar or lockpick soon ascertains the relative position of the permutation-wheels and their notches.

It is the object of our improvement to allow the dog to operate without being connected in any manner whatever with the operating shaft or key, so that the said dog cannot be brought in contact with the edges of the wheels in such a manner as to indicate to the operator the position of the wheels. In order to accomplish this, we employ a magnet.

In general construction this lock resembles others of its class. A is the outer case; B, the bolt; C, the operating shaft or key, and D the permutation-wheels, provided with the usual notches, $a\ a$, and operated by any desirable means, that represented being pins $b\ b$, running in grooves $c\ c$ of the wheels, and striking against stops $d\ d$.

Within the lock we place a magnet, E, of any desired form, that represented being a ring encircling the permutation-wheels, and provided with an opening or break, $f$, through which the dog $g$ passes to strike into the notches $a$ of the permutation-wheels when the same come in coincidence. The dog $g$ is secured to an armature, G, of soft iron, that is preferably suspended, as shown at $h$, in such a manner that when the connection of said armature with the magnet is broken it will hang loose, as shown in Fig. 1. A stop, $i$, prevents it from falling back too far.

In order to prevent the attractive action of the magnet on the armature G, except when desired, a main armature, H, is also employed, which comes in contact with the magnet. We prefer to secure this armature to the end of a swing-gate, I, jointed or hinged at $k$ so as to swing outward a little distance against the back plate of the lock, as indicated by red lines, Fig. 3, in order to break the connection with the magnet and to allow the bolt to be acted on, as will presently be described.

The swing-gate is provided at a suitable position with two shoulders, $l$ and $m$, Figs. 1 and 4, between which the bit $n$ of the shaft or key C plays and strikes to throw the bolt with which the gate is connected forward or back. The shoulder $l$ is situated in the inner face of the gate, so that the bit is allowed to play outside of it, except when the gate is thrown outward from the magnet. Between these shoulders is situated a cam-pin, $o$, on the outer face of the gate, made inclined upon its under side, against which the bit strikes at every revolution and opens or throws the gate outward.

The armature G is provided with projections $p\ p'$ on each side, Figs. 1 and 5. When the gate is open and the armature G is in contact with the magnet, the end $p$ shuts in behind the end of the gate and holds the latter out while the bolt is being retracted. The opposite end, $p'$, strikes against an arm, $q$, of a tumbler, K, which is jointed at $r$ in such a manner that the preponderance of weight is at the rear or outer end. The inner end, s, of the tumbler is so situated that when the armature G hangs free, as in Fig. 1, the end t of the bolt strikes against it and prevents the bolt from being thrown back; but where the armature moves up to the magnet it throws the tumbler down, as in Fig. 2, thereby allowing the bolt to be thrown back. This action of throwing the tumbler down to release the bolt is not accomplished, however, till the dog g has entered the notches a.

The operation of this device is at once apparent. The permutation-wheels are revolved by means of the shaft or key C till the notches a a come in coincidence. Then the bit m comes in contact with the cam-pin o and throws the gate I outward, thereby breaking the connection of the armature H with the magnet, as indicated by red lines, Fig. 3. The moment this occurs the armature G is drawn in contact with the magnet, (the dog g entering the notches a a,) and the tumbler K is thrown downward, thereby freeing the bolt, as before described. The gate I now being thrown outward, the bit n in turning strikes against the shoulder l, which in this position comes opposite it, and the bolt is forced back or retracted. In throwing the bolt forward again the bit strikes the shoulder m, and on turning the permutation-wheel sufficiently the inclined sides u' of the notches a force the dog g outward, breaking the connection of the armature G and releasing the armature H, which moves up to the magnet again, while the tumbler K falls back into its original position and holds the bolt out.

The great and essential advantage of this arrangement is, that the dog g has no connection whatever with the shaft or key C, but acts entirely independent of it. In all other permutation-locks with which we are acquainted the dog is operated by a cam or equivalent on the shaft or key that comes in direct contact with the dog. In such case, at every touch of the cam on the dog the latter is brought in contact with the wheels, and the action or result of this touch can be transferred along the shaft or key to a delicate instrument applied outside, so that the relative position of the wheels can be soon ascertained by an experienced lockpick. In our device it will be seen that this difficulty is obviated, for the shaft or key does not touch the dog at all.

It is obvious that the arrangement of parts may be changed from that above described and still the same substantial result be attained.

We do not confine ourselves to the precise arrangement set forth. For instance, the arrangement of the armature G and dog g might be changed. The dog might easily be formed on the end of the bolt itself or in some other relation. The gate might be dispensed with and an equivalent device employed. The tumbler might be modified in form and action, and the permutation-wheels might be of various constructions. But the employment of a magnet in combination with a suitable arrangement of mechanical parts is necessary.

The magnet may be charged by contact with an ordinary magnet or by electro-magnetic induction, as may be most desirable or convenient.

We prefer the arrangement of permutation-wheels represented in Figs. 6, 7, 8 of the drawings. Each wheel consists of a ring, u, Fig. 6, having a small slot or opening, v, which divides it, and a center, w, Fig. 7, which rests within the ring. The ring is so constructed that on forcing a wire or small wedge into the opening v the ring will spring or expand laterally, as indicated by red lines, sufficiently for the insertion of the center w, and for allowing it to turn. In order to hold the center in place in the ring, a tongue on one and a groove on the other, or equivalent, may be employed, as shown at y, Fig. 8. By this arrangement it will be perceived that when all the permutation-wheels are brought on a line a small wire or wedge may be run through all the slots v v of the rings, thereby expanding them, and then, by turning the operating shaft or key the centers w can be adjusted to any new combination, which is indicated by the dial usually employed outside of the lock. We are thus enabled to set the combination of the lock without removing the wheels from place. In ordinary locks it is necessary to remove the wheels and adjust them by hand in order to form a new combination. An index-scale on the wheels is also avoided.

In order to hold the permutation-wheels in place on their bearing C, and to keep them properly apart, so that they should not rub together in adjusting, we provide the said bearing with transverse grooves j j, Fig. 7, over which the wheels rest, and also provide the wheels with small pins z z, or equivalent, which project down into said grooves. These pins may be made either rigid or removable, as may be desired; or they may be connected with a spring that will hold them down in place. It will be seen that while this arrangement prevents any contact of the wheels together it also allows a free turning movement of the same, so that they can be easily adjusted. Something of this nature is essential to keep the wheels apart, otherwise they would not operate.

What we claim as our invention, and desire to secure by Letters Patent, is—

1. A magnet employed in combination with the mechanism of a lock in such a manner as to disconnect the action of the dog or equivalent that releases the bolt from the operating shaft or key, substantially as herein set forth.

2. In combination with the magnet E, the employment of the armatures G H, the former having the dog g attached and so operating in relation to the permutation-wheels that when the connection of H is broken that of G will be formed to allow the dog to enter the notches, substantially as set forth.

3. In combination with the gate I, the shoulders *l m* and the cam-pin *o*, arranged and operating substantially as described.

4. The tumbler K, in combination with the armature G, substantially as herein set forth.

5. Retaining the permutation-wheels in place on their bearing and preventing them from coming in contact with each other by means of the grooves *j j* and pins *z z*, or equivalent, substantially as herein set forth.

6. The combination of the spring-ring *u* and center *w*, constituting the permutation-wheels, substantially as and for the purpose herein set forth.

In witness whereof we have hereunto signed our names in the presence of two subscribing witnesses.

JAS. SARGENT.
H. W. COVERT.

Witnesses:
R. F. OSGOOD,
J. A. DAVIS.